United States Patent Office 3,259,131
Patented July 5, 1966

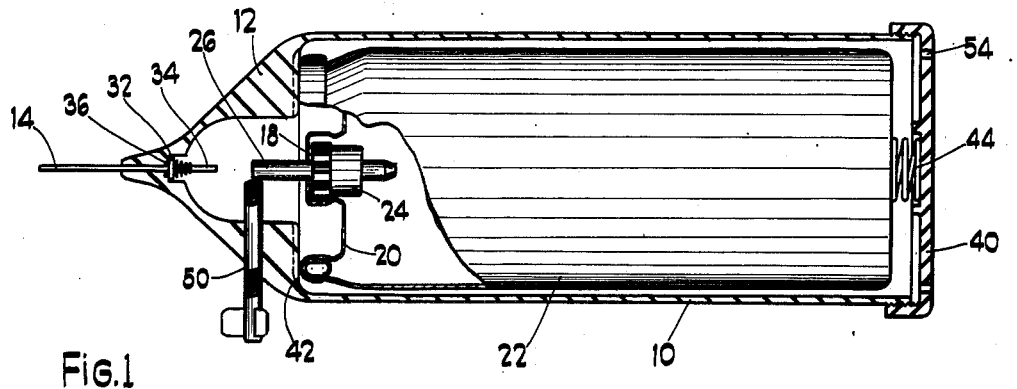
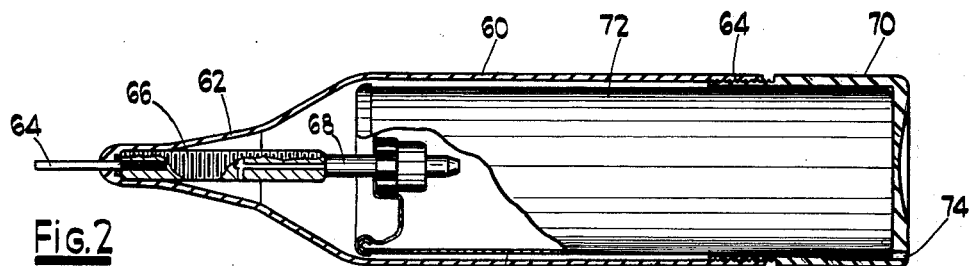
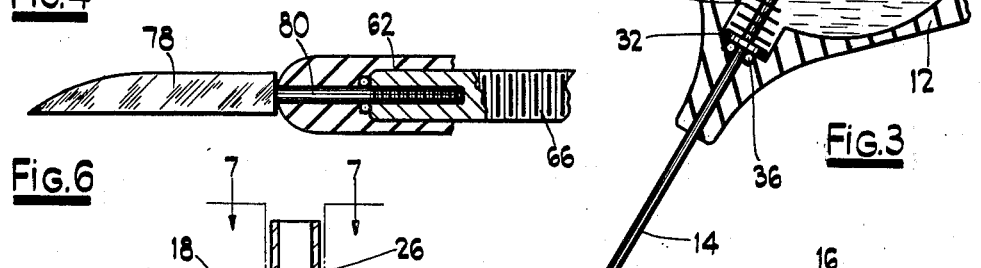
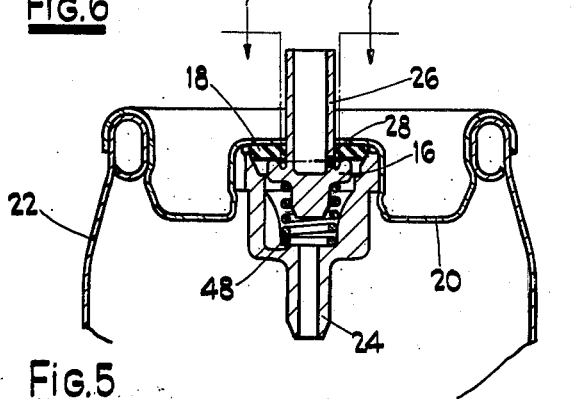
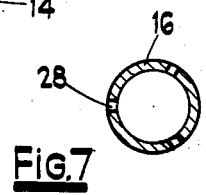

3,259,131
CRYOGENIC PROBES FOR SURGICAL USE
Maurice S. Kanbar, New York, Owen F. Van Brocklin, Baldwin, and Stelio J. Elmi, Hempstead, N.Y., assignors to A. Schrader's Son, Division of Scovill Manufacturing Company, Brooklyn, N.Y., a corporation of Connecticut
Filed Apr. 13, 1964, Ser. No. 359,195
4 Claims. (Cl. 128—303.1)

This invention relates to probes for use in surgery and more particularly to a probe having means to render the outer end portion of the probe extremely cold, sufficient to completely freeze body tissue in contact with the tip or outer end of the probe.

A primary object of the invention is to provide means to control the supply of extremely small amounts of a liquified gas propellant from a supply under pressure and to discharge this into an expansion chamber adjacent the inner end of the probe, and permit expansion of the gas to subtantially atmospheric pressure so that this rapid expansion of the gas will greatly reduce the temperature of the parts of the probe surrounded by the expanded gas, and by conduction along the probe will reduce the temperature of the outer end of the probe.

A feature that enables the above object to be accomplished is that the probe, per se, is made of metal, such as copper, silver, or other metal, having a high heat conducting property, so that when the liquified gas is applied to evaporate from a pool surrounding the inner portion of a metal probe, the outer tip or active end of the probe will be cooled to an extremely low temperature by conduction along the probe.

Another object of importance of the invention is that the container for the supply of liquified gas is enclosed within a body member of generally cylindrical form having a hollow tapered end portion, from which tapered end the probe extends, the tapered end of the body member being formed integrally with the cylindrical portion, or separately therefrom if so desires.

Still another object of importance of the invention is that provision is made for manual control for the admission of the liquified gas to the space within the tapered end of the body member which thus forms an expansion chamber within the instrument adjacent the inner end of the probe.

A feature of the manual control for the admission of liquified gas to the expansion chamber is that a small pool of liquid may be maintained within the space adjacent the inner end of the probe, and when it is desired to discontinue the freezing action, the supply may be stopped and the small pool of liquid may be allowed to evaporate.

And finally it is an object of importance of the invention to provide alternate forms of probes which may be secured to a fixed inner portion of the probe.

With the above and other objects in view, the invention includes the features of construction and operation set forth in the following specification and illustrated in the accompanying drawing.

In the accompanying drawing annexed hereto and forming a part of this specification, we have shown the invention embodied in a small surgical instrument particularly adapted for use in operations on the eye and surrounding tissue, but it will be understood that the invention can be otherwise embodied, and that the drawing is not to be construed as defining or limiting the scope of the invention, the claims appended to this specification being relied upon for that purpose.

In the drawing:
FIGURE 1 is a central longitudinal section of a complete instrument made according to the present invention;

FIGURE 2 is a view similar to FIGURE 1 of a modified form of the invention;

FIGURE 3 is an enlarged sectional view of the probe and a portion of the tapered end of the body member for the probe shown in FIGURE 1;

FIGURE 4 is an enlarged longitudinal view partly in section of the probe shown in FIGURE 2;

FIGURE 5 is an enlarged sectional view of the valve for admitting liquidified gas to the expansion chambers of the forms of the invention shown in FIGURES 1 and 2;

FIGURE 6 is a longitudinal view of an alternate form of probe usable with the form of invention shown in FIGURE 2 having a longitudinal cutting edge along one side; and FIGURE 7 is a sectional view of the valve member taken on a plane of broken line 7—7 in FIGURE 6.

In the above mentioned drawing, there have been shown but two embodiments of the invention now thought to be preferable, but it will be understood that changes and modifications may be made within the scope of the appended claims without departing from the spirit of the invention.

Referring more in detail to the figures of the drawing, and first to FIGURE 1, it will be seen that the body portion 10 of the probe assembly is, or preferably may be, formed of polymeric material such as polypropylene having substantial strength and rigidity. As shown, the hollow body portion 10 is tapered at one end 12 through which extends an elongated metal probe 14. One end of the probe 14 extends beyond the conical end 12 of the body member 10. The conical end 12 of the body portion, through which the probe extends, forms a firm support for the metal probe and also acts as a heat insulating casing therefor. In the drawing, the conical or tapered end 12 of the body member or receptacle 10 is shown to be integral. However, for convenience in manufacturing, this part 12 of the body member 10 may be formed separately and rigidly attached to the cylindrical portion.

The probe, per se, which as shown is in the form of an elongated rod of copper, silver, or other heat conductive material, extends centrally within the tapered portion 12 of the body member or receptacle 10 with its inner end adjacent a discharge valve 16 for the liquified gas; this valve 16 normally is spring pressed against its seat 18 carried at one end 20 of a hollow container 22 for the liquified gas. The gas may be a commercial liquified gas, such as one of the halocarbons, or other suitable liquifiable gas having the desired low boiling temperature; this gas being admitted to the space within the container 22 of standard form in any preferred manner.

The supporting member 20 for the valve seat 18 forms the end face of the container 22 and is secured, as shown in FIG. 5, to the cylindrical surface of this container by crimping the metal of the end surface 20 around the rolled-over end of member 22. Preferably the valve seat 18 is formed of a hard but slightly resilient non-metallic material such as "Graphitar" of annular form. This valve seat 18 preferably fits within a recess of the end face 20 of the container 22 and, through this annular seat member 18, extends a tubular integral extension 26 of the valve member 16. Radial openings 28 are formed in this valve member 16 closely adjacent and below the valve seat 18 as seen in FIG. 5. Upon movement laterally of the upper end of the valve member extension 26, by means presently to be described, the valve member 16 is tilted slightly from its seat 18 so that the liquified gas may pass from the container 22 past the valve 16 and through the radial openings 28 into the annular space of the body member or enclosure 10, which forms an expansion chamber therefor surrounding the valve extension 26. Expansion of the liquified gas from its high pressure in the container 22 to substantially atmospheric pressure as it passes into the space surrounding the probe 14 serves to greatly reduce the temperature of the probe and surrounding areas and subsequently reducing the temperature of the expelled propellant. With the probe held as shown in FIG. 3, which is the position in which the instrument is used during operations, a pool of the liquified gas forms within the tapered end 12 of the receptacle 10.

The probe 14, as shown in FIGS. 1 and 3, is in the form of a straight elongated rod having a positioning flange 32 at an intermediate part of its length. At the inner end of the probe may be provided a plurality of heat radiating fins 34. Adjacent and above the flange 32 is an O ring 36 forming a seal between the probe 14 and its enclosing member 12. The member 12 through which the probe centrally extends preferably may be polypropylene of sufficient resiliency that the probe 14 may be pressed firmly into position therein The member 10 and its tapered portion 12 also as shown, form the enclosing member for the liquified gas container 22 which has a cap member 40 at its opposite end to form a closure therefor. To retain the gas container 22 against abutments 42 formed in the enclosing member 10 is a short helical spring 44 placed between the cap member 40 and end face of the container 10. It is through this end of the enclosing or body member 10 that the gas container 22 is positioned within the body member.

The valve seat 18 referred to above is maintained in place by the valve body member 24, which is serrated at its periphery, being pressed into the recessed front end 20 of the liquified gas container 22. By the above-described means, the liquified gas may be admitted, when the probe assembly is inverted while being used, to the expansion chamber or space within the tapered end 12 of the body member 10 surrounding the valve member extension 26. Thus, when the valve 16 is slightly tilted, the flow of the liquified gas will be from the container 22 past the valve 16 through the openings 28 in the valve member 16 and through the extension 26 of the valve member into the space within the conical end 12 of the enclosure or body member 10 and surrounding the inner end of the probe 14. In this expansion chamber the liquified gas will form a small pool from which it will be exhausted by means presently to be described.

To tilt the valve member 16 against the pressure of a spring 48 within the valve body member 24 bearing against the valve member 16, the following is provided. Extending laterally through the conical end 12 of the probe enclosing member 10 is a screw 50, the inner end of which engages against a side of the valve member extension 16 adjacent its outer end. Rotation of the screw in one direction forces the valve member 16 to tilt and thus slightly open the valve 16 and permit a limited flow of the liquified gas into the space surrounding the inner end of the probe 14. Rotation of the screw in the opposite direction will close the valve and shut off further flow of the gas.

In the embodiment of the invention shown in FIG. 2, it will be seen that the receptacle 60 is tapered at one end 62 for the probe 64 and at its opposite end is threaded as shown at 64. Within the tapered end 62 of the receptacle 60 is a member in the form of a rod 66, threaded throughout its length. Within the outer end of this threaded member 66 is the probe 64, the inner end of which may be threaded or otherwise secured in heat radiating relation to member 66.

The inner end of member 66 bears against the outer end of a valve member 68 which may be in every way similar to valve extension 26 shown in FIG. 5. By rotating the cap member 70 relative to the body member 60, the valve member 68 is forced against the inner end of member 66 so that the valve member 68 is forced in a direction to open and permit liquified gas within a container 72 to flow through longitudinal and radial channel 73 in member 66 into the expansion chamber within the tapered end 62 of the receptacle 60 surrounding the member 66. From this chamber the liquified gas after vaporization may pass from the expansion chamber and through the space between the receptacle 60 and the container 72 for the liquified gas which may be similar to container 22 in the embodiment of the invention shown in FIGS. 1 and 3. From this annular space the vaporized gas may escape through recesses and holes 74 formed in the cap 70.

In FIG. 6 an alternate form of probe is shown. This, as shown, is in the form of a small scalpel 78, the inner end of which forms a tang 80, the inner end of which is threaded and enters the outer end of member 66.

In the use of the probe, the enclosure member 10 or 60 is inverted to a position shown in FIG. 3 so that the probe 14 points downward and the discharge valve 16 in either model is then slightly opened by rotation of the screw 50 or cap 7. The liquified gas then passes from container 22 or 72 into the valve body member 24 and past the valve member 16. From this position the liquified gas passes through the openings 28 into the valve member extension 16 and then into the expansion chamber 25 within the tapered end 12 or 62 of the enclosing member 10 or 60. Pressure of the gas after evaporation is prevented from building up in this expansion chamber and the gas after vaporization may pass in the model shown in FIG. 1 between the walls of the container 22 and receptacle 10 to openings to atmosphere 54 formed in the cap. In the second model, the pressure is prevented by the space between container 72 and the enclosing member 60 and by recesses and openings 74 in cap 70.

We claim as our invention:

1. A self-contained lightweight cryogenic probe for surgical uses comprising,
    (a) a hollow elongated cylindrical housing having a cross-sectional dimension such that it may be readily held in the hand of the surgeon,
    (b) said housing defining a cylindrical receptacle at one end thereof and an expansion chamber adjacent said receptacle, said receptacle opening directly into said expansion chamber,
    (c) a container of a liquified gas within said receptacle, said container including a dispensing valve for controlling the flow of liquified gas from said container directly into said expansion chamber,
    (d) an elongated solid heat-conductive slender probe rigidly supported intermediate its ends in a wall of said expansion chamber, said probe having a relatively small cross-sectional dimension in comparison to its length and such that it may be employed to probe the eye, the inner end of said probe extending into said expansion chamber,
    (e) means for actuating said dispensing valve,
    (f) and vent means for exhausting spent gases from said housing.

2. A self-contained lightweight cryogenic probe for surgical uses comprising,
    (a) a hollow elongated cylindrical housing having a cross-sectional dimension such that it may be readily held in the hand of the surgeon,
    (b) said housing defining a cylindrical receptacle at one end thereof and an expansion chamber adjacent said receptacle, said receptacle opening directly into said expansion chamber,
    (c) a container of a liquified gas within said receptacle, said container including a dispensing valve for controlling the flow of liquified gas from said container directly into said expansion chamber,
    (d) an elongated solid heat-conductive slender probe rigidly supported intermediate its ends in a wall of said expansion chamber, said probe having a relatively small cross-sectional dimension in comparison to its length and such that it may be employed to probe the eye, the outer end of said probe extending beyond said housing and the inner end of said probe extending into said expansion chamber for heat exchange with the gas, said inner end including means for increasing the rate of heat transfer between said probe and the gas, (e) means for actuating said dispensing valve, (f) and vent means for exhausting spent gases from said housing.

3. A self-contained compact lightweight cryogenic probe for surgical uses comprising, (a) a hollow elongated cylindrical housing having a cross-sectional dimension such that it may be readily held in the hand of the surgeon, (b) said housing defining a cylindrical receptacle at the rear end thereof and an expansion chamber at the front end thereof, said receptacle opening directly into said expansion chamber, said expansion chamber having a smaller cross-sectional dimension than said receptacle, (c) a container of a liquified gas within said receptacle, said container including a dispensing valve for controlling the flow of liquified gas from said container directly into said expansion chamber, (d) an elongated solid heat-conductive slender probe rigidly supported intermediate its ends in the wall of said expansion chamber, said probe having a relatively small cross-sectional dimension in comparison to its length and such that it may be employed to probe the eye, the outer end of said probe extending beyond said housing and the inner end of said probe extending into said expansion chamber for heat exchange with the liquified gas, said inner end including fins for increasing the rate of heat exchange between said probe and the liquified gas, (e) means for actuating said dispensing valve, (f) and vent means for exhausting spent gases from said housing.

4. A self-contained lightweight cryogenic probe for surgical uses comprising, (a) a hollow elongated cylindrical housing having a cross-sectional dimension such that it may be readily held in the hand of the surgeon, (b) said housing defining a cylindrical receptacle at the rear end thereof and a conical shaped expansion chamber at the forward end thereof, said receptacle opening directly into said expansion chamber, (c) a container of a liquified gas within said receptacle, said container including a dispensing valve for controlling the flow of liquified gas from said container directly into said expansion chamber, (d) an elongated solid heat-conductive slender probe rigidly supported intermediate its ends in the wall defining the apex of said expansion chamber, said probe having a relatively small cross-sectional dimension in comparison to its length and such that it may be employed to probe the eye, the outer end of said probe extending beyond said housing and the inner end of said probe extending within said expansion chamber for heat exchange with the liquified gas, said inner end including fins for increasing the rate of heat transfer between said probe and the liquified gas, (e) means for actuating said dispensing valve, (f) and vent means for exhausting spent gases from said housing.

References Cited by the Examiner

UNITED STATES PATENTS

| | | | |
|---|---|---|---|
| 2,645,097 | 7/1953 | Posch. | |
| 2,982,112 | 5/1961 | Keyes. | |
| 3,093,135 | 6/1963 | Hirshhorn | 128—303.1 |
| 3,190,081 | 6/1965 | Pytryga | 128—400 XR |

RICHARD A. GAUDET, *Primary Examiner.*

W. E. KAMM, *Assistant Examiner.*